Figure 2:
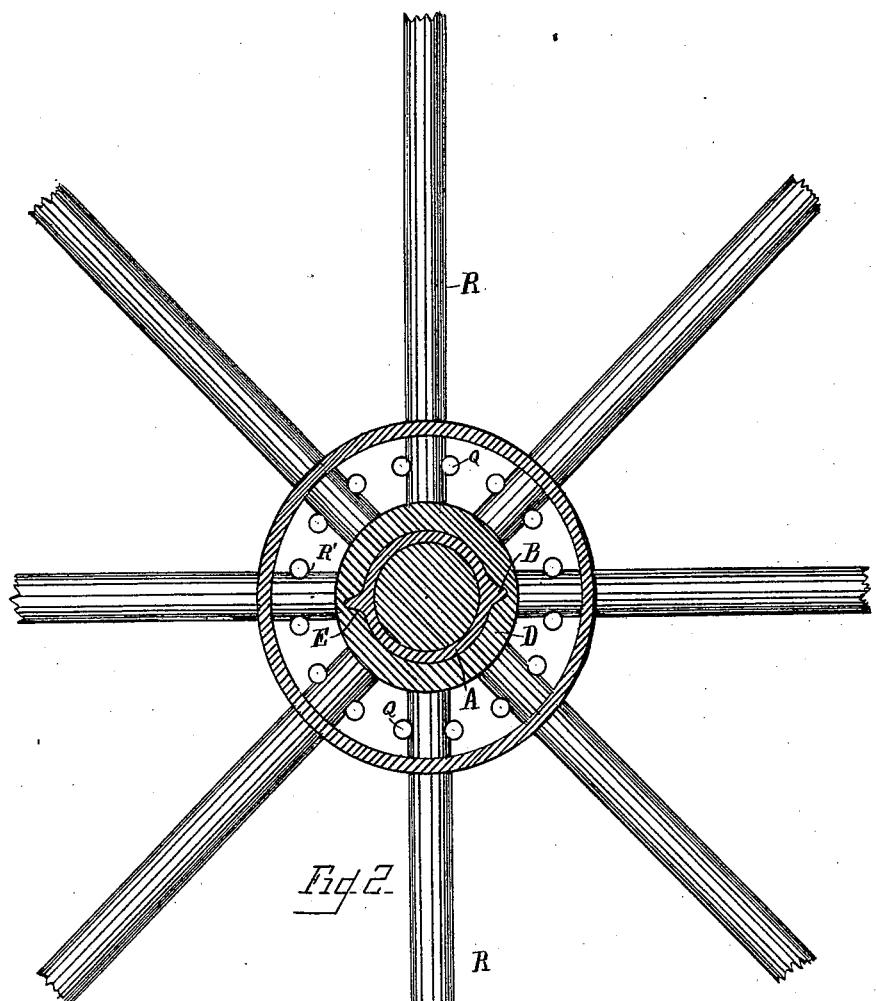

(No Model.) 2 Sheets—Sheet 1.
W. D. BURGESS & T. C. MUNZ.
METAL WHEEL.
No. 420,927. Patented Feb. 11, 1890.
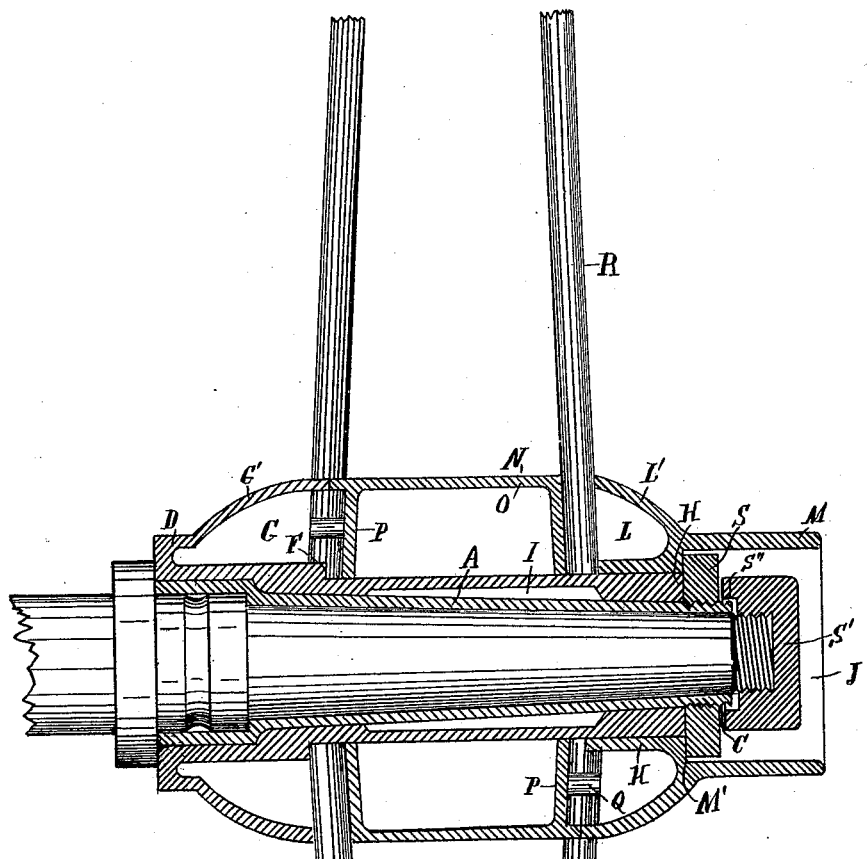
Fig 1.
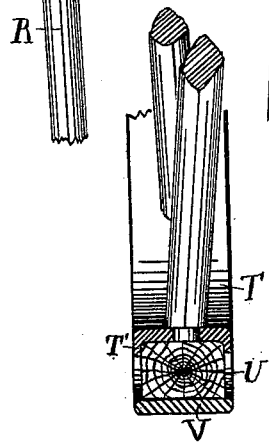
WITNESSES
Carroll J. Webster.
Anna J. Lehaney.
INVENTOR
William D. Burgess
Theodore C. Munz
By William Webster
Atty (No Model.) 2 Sheets—Sheet 2.

W. D. BURGESS & T. C. MUNZ.
METAL WHEEL.

No. 420,927. Patented Feb. 11, 1890.

WITNESSES
Carroll J. Webster.
Anna J. Lehaney.

INVENTOR
William D. Burgess
Theodore C. Munz
By William Webster
Atty

UNITED STATES PATENT OFFICE.

WILLIAM D. BURGESS AND THEODORE C. MUNZ, OF TOLEDO, OHIO, ASSIGNORS OF ONE-THIRD TO EDGAR H. VAN HOESEN, OF SAME PLACE.

METAL WHEEL.

SPECIFICATION forming part of Letters Patent No. 420,927, dated February 11, 1890.

Application filed March 11, 1889. Serial No. 302,790. (No model.)

*To all whom it may concern:*

Be it known that we, WILLIAM D. BURGESS and THEODORE C. MUNZ, citizens of the United States, residing at Toledo, in the county of Lucas and State of Ohio, have invented certain new and useful Improvements in Metal Wheels; and we do hereby declare that the following is a full, clear, and exact description of the invention, which will enable others skilled in the art to which it appertains to make and use the same, reference being had to the accompanying drawings, and to the letters of reference marked thereon, which form part of this specification.

Our invention relates to metal wheels, and has especial reference to that class used in carriages, agricultural implements, trucks, &c.

One object of the invention is to construct the hub of but few parts, that can be cast or pressed to the desired form, and assembled without the necessity of expensive fitting.

A further object is to form the hub to receive the ordinary axle box.

A further object is to secure the spokes within the hub by means of projecting studs, which shall lie within grooves formed into the sides of the spokes.

A further object is to interpose a wood rim between the wheel rim and tire, whereby to allow the tire to be shrunk upon the wheel, as in the ordinary wooden wheel, whereby the tire may removed when worn and a new one substituted, and also to cushion the impact that may be given the tire from affecting the metal rim.

The invention consists in the parts and combination of parts hereinafter described, and pointed out in the claims.

In the drawings, Figure 1 is a longitudinal vertical section through the center of the wheel and axle-box, the axle being shown in position within the box. Fig. 2 is a cross-sectional elevation through the wheel, box, and axle, showing the diametrically-opposite lugs upon the box seated within recesses within the hub-casting, and also the manner of securing the spokes in place within the hub.

A designates an ordinary form of axle-box, formed with the usual lugs B at diametrically-opposite sides thereof. For the purposes of our invention a thread C is cut upon the forward end of the box A, as shown in Fig. 1.

D designates a shell adapted to fit upon box A and extend to the threaded portion thereof. Shell D is formed with recesses E, into which lugs B fit to hold the box from rotating within the hub, and also with an annular shoulder F, caused by reducing the diameter of the shell immediately forward of the recesses, the remainder of the shell forward of the shoulder being of the same external diameter. Upon the rear end of the shell is formed an annular chamber G, the sides G' of which terminate in a substantially vertical plane with shoulder F, the edge of the side G' of the chamber being preferably formed with recesses corresponding in form with the one-half of the spoke, there being like recesses formed within the edge of the annular shoulder F, whereby when the spokes are in position one-half of the same shall rest within the recess.

To insure a close bearing upon box A, and also to compensate for the taper of the same, and at the same time to preserve a uniform diameter to the exterior of the shell forward of the shoulder, there is an annular enlargement H formed internally upon the outer end of the shell, thereby causing the bearing to be upon each end of the shell and forming a concentric chamber I, surrounding the box, which may be utilized as a receptacle for lubricant, if desired, and the lubricant led to the axle-spindle through perforations. (Not shown.)

J designates the front end portion of the hub, and is formed with an annular portion K, of a diameter to fit closely upon the front end of shell D, the annular portion being of a width to encircle the shell from the front end thereof and extend rearwardly to serve as a shoulder for the ends of the series of spokes radiating from the front end to abut against. The portion J is formed with an annular chamber L, corresponding to chamber G of the rear side of the hub. The sides L' of chamber L, as well as the edge of the annular portion K, are formed with recesses corresponding in size with the one-half of the size of the spokes, whereby one-half of the spokes shall rest within the recesses when placed within the hub. The forward part of the end J is formed into a sand-band M, extending from a shoulder M' formed thereon.

N designates the central portion of the hub, and is formed of an annulus O, of a diameter and width to register with sides G' and L' of the rearward front portions, respectively, of the hub. The edge upon each side of the central portion N is formed with recesses corresponding in size to one-half of the size of the spoke, these recesses coinciding with those in the sides G' and L', respectively, forming a recess of the exact size and shape of the spoke.

P designates concentric flanges extending from annulus O to closely embrace shell D, these flanges being of a width to fit closely between shoulder F and the inner edge of the annular portion K and hold the spokes closely within the recesses.

Q designates lugs formed upon flanges P concentric to shell D, and are designed to hold the spokes in place within the hub.

R designates the spokes, which may be of round iron, tubular, oval, or rectangular in cross-section. Each spoke is formed with recesses R', one upon each side, adapted to receive a portion of a lug Q, as shown in Fig. 2, thereby securely holding the spokes from radial movement within the hub.

S designates a nut run upon the threaded end of the box, and S' the usual nut upon the axle-spindle, the nut S' being preferably formed with an annular portion S'', to encircle the box and prevent ingress of dust.

T designates the metal rim of the wheel, which is preferably formed with slightly-upturned flanges T', to receive a rim U, of wood, upon which is secured a tire V, this tire being preferably secured by shrinking the same thereupon.

In assembling the parts to form a wheel the spokes are placed within the recesses in shoulder F and side G' of the shell, the recesses R' of the spokes receiving lugs Q. The central portion N is then placed upon the shell and the spokes arranged in like manner upon the opposite end, the spokes resting against flange P, and the end portion J is placed upon the end of the shell with the spokes fitting into the recesses in annulus K and side L'. Box A is now inserted into the shell and nut S screwed securely against shoulder M', thereby forcing the parts into close relation. The rim T is now secured to the spokes. The rim U, of wood, is placed thereupon, and the tire secured upon the wood preferably by shrinking the same thereon, although, as will be apparent, we may dispense with the flange T' and secure the tire and interposed material by rivets or pins.

What we claim is—

1. In a metal wheel, the combination, with axle-skein, of a shell adapted to receive and hold the said skein, and having the rear hub portion cast integral with said shell, a central hub portion resting upon the shell, the front hub portion formed with an internal annular flange adapted to bear upon the front end of the shell and retained upon the same by suitable nuts screwed upon the axle-skein, and the spokes held between the hub-section, substantially as shown and described.

2. In a metal wheel, the combination, with an axle-skein, of a shell surrounding the same, said shell being formed at its rear end with a shoulder having recesses to receive the ends of the spokes, a rear hub portion concentric with the shell and cast integral with the rear end of the same, the forward end of such hub portion being notched or recessed at intervals to partially surround the spokes, a central hub portion concentric with the shell and formed with transverse internal flanges adapted to rest upon the shell and support the central hub-section, the ends of said section being notched to partially embrace the spokes, a forward hub portion formed with an internal annular flange adapted to bear upon the forward end of the shell, the edge of said flange being recessed or notched to partially embrace the ends of the spokes and held upon the same by suitable nuts upon the outer end of the axle-skein, and the spokes held between the hub-sections, substantially as shown and described.

3. In a metal wheel, the combination, with the axle-skein, of a shell surrounding the same, the rear end formed with a shoulder and a rear hub portion cast integral therewith, said shoulder and hub portion being notched or recessed at their forward ends to receive the spokes, a central hub portion concentric with the shell formed with notched or recessed ends to receive the spokes, and having internal transverse flanges to bear upon the shell and support the central hub portion, said flanges being formed with horizontal lugs arranged at right angles thereto, a forward hub-section formed with the external portion L', band M, and internal flange H, adapted to bear upon the forward end of the axle-skein, the rear edges of said portion and flange being recessed or notched to receive the spokes, the nut screwed upon the axle-skein and holding the parts together, and the spokes held securely between the sections, said spokes having notches formed near their inner ends adapted to be engaged by the lugs upon the flanges and hold them from displacement, substantially as shown and described.

In testimony that we claim the foregoing as our own we hereby affix our signatures in presence of two witnesses.

WILLIAM D. BURGESS.
THEODORE C. MUNZ.

Witnesses:
WILLIAM WEBSTER,
CARROLL J. WEBSTER.